Oct. 2, 1962 M. E. SNODDY 3,056,617
HIGH PRESSURE FITTING
Filed July 24, 1959 2 Sheets-Sheet 1

INVENTOR
Max E. Snoddy
BY Ashley & Ashley
ATTORNEYS

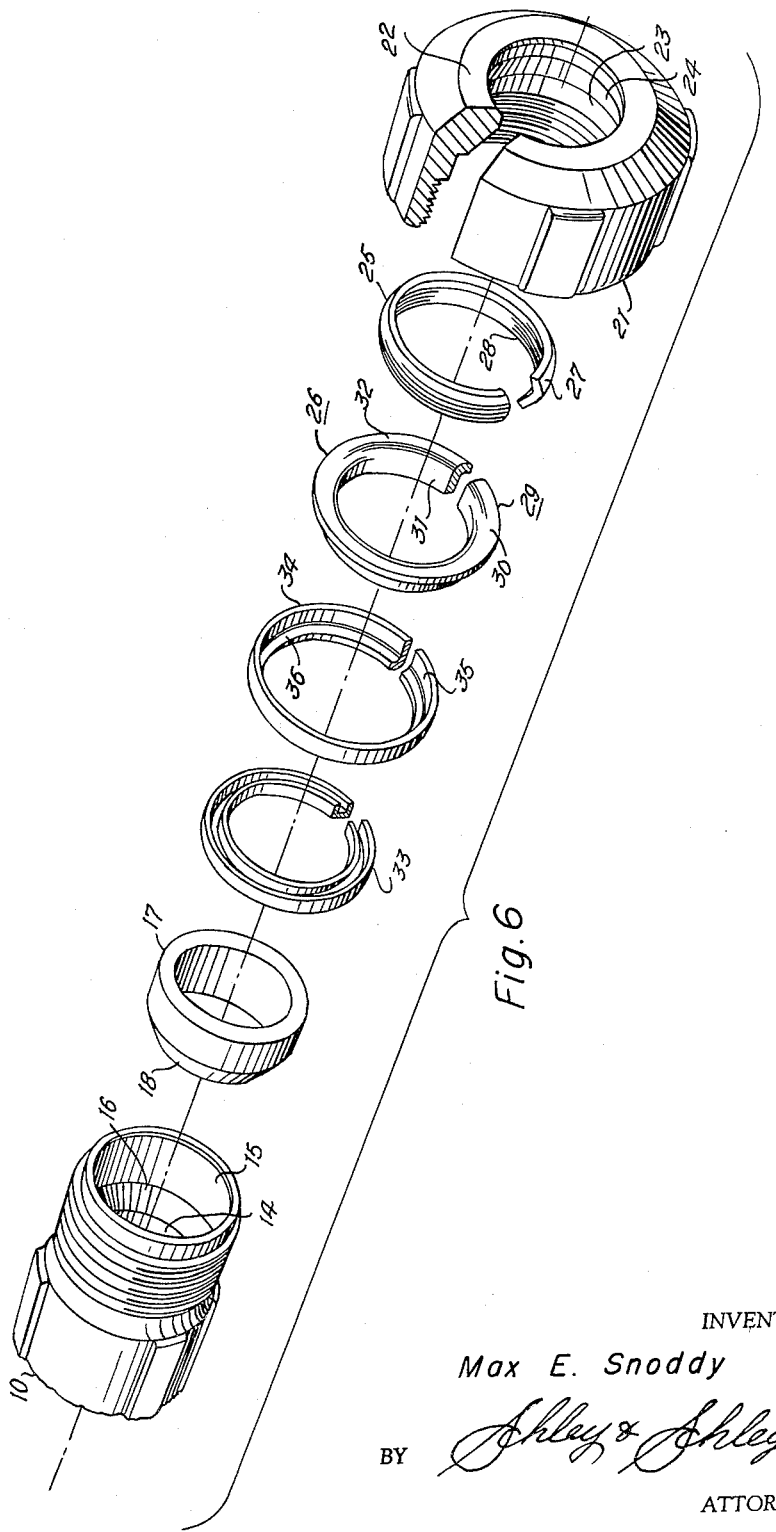

United States Patent Office 3,056,617
Patented Oct. 2, 1962

3,056,617
HIGH PRESSURE FITTING
Max E. Snoddy, 5422 Redfield, Dallas 35, Tex.
Filed July 24, 1959, Ser. No. 829,327
4 Claims. (Cl. 285—341)

This invention relates to new and useful improvements in high pressure fittings.

One object of the invention is to provide an improved fitting for joining pipe without flanging, expanding, brazing, welding, grooving or threading and so constructed as to be capable of confining fluids under relatively high pressures, of the order of 3500 p.s.i.g. for working pressures of 1000 p.s.i.g.

Another object of the invention is to provide an improved high pressure pipe fitting which may be in the form of a coupling, adapter, elbow or T and which has a split clamp ring of novel construction for gripping a pipe and for coacting with a flanged nut and thrust ring to deform and maintain a packing element in sealing engagement with the pipe.

An important object of the invention is to provide an improved fitting, of the character described, wherein the clamp ring is substantially angular or arcuate in cross-section and has relatively sharp edge portions for positive engagement with the pipe, said ring being non-deformable so as to be movable with the thrust ring upon tightening of the nut so as to completely deform the packing element prior to the positive engagement of its edge portions.

An important object of the invention is to provide an improved fitting, of the character described, wherein the nut and thrust ring have coacting surfaces for engaging the exterior of the clamp ring to contract said clamp ring and force its edge portions into positive engagement with the pipe upon tightening of said nut.

A further object of the invention is to provide an improved fitting, of the character described, wherein the packing element is in the form of an annular gasket having a bevelled inner end for engaging a complementary shoulder of the fitting with a plurality of balls or beads being embedded in its inner extremity to prevent extrusion thereof between the pipe and fitting when the gasket is deformed.

A construction designed to carry out the invention will be hereinafter described, together with other features of the invention.

Figure 1:
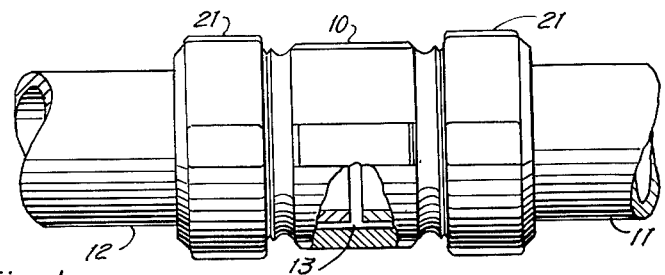
Figure 2:
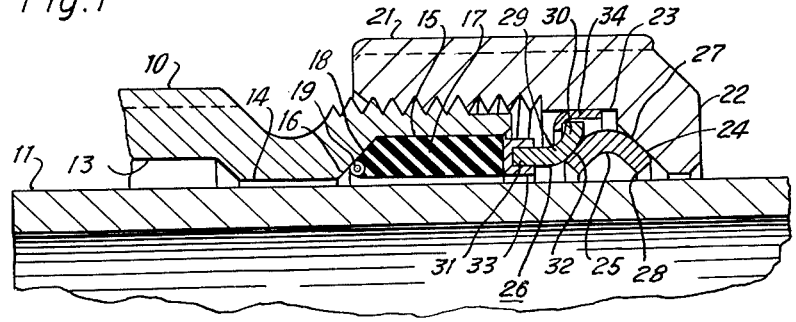
Figure 3:
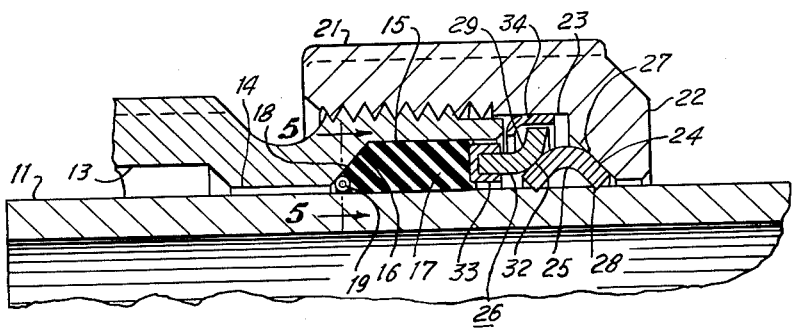
Figure 4:
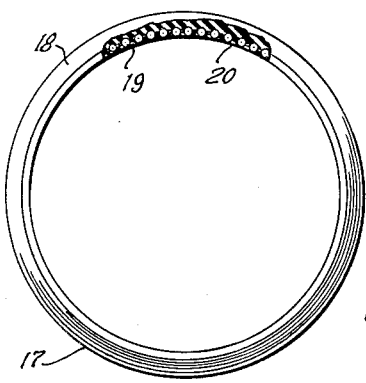
Figure 5:
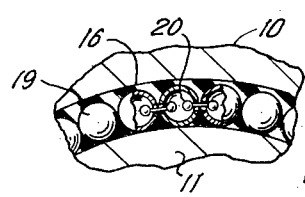

The invention will be more readily understood from a reading of the following specification and by reference to the accompanying drawings, wherein an example of the invention is shown, and wherein:

FIG. 1 is a side elevational view, partly in section, of a fitting constructed in accordance with the invention for joining plain end pipe, FIG. 2 is an enlarged, cross-sectional view of one end portion of the fitting showing the relationship of its clamping and sealing elements prior to tightening of its nut, FIG. 3 is a view, similar to FIG. 2, showing the elements of the fitting in clamping and sealing position, FIG. 4 is an end elevational view, partly in section, of the gasket undeformed with its beads spaced from one another, FIG. 5 is an enlarged, cross-sectional view, taken on the line 5—5 of FIG. 3, of the inner portion of the deformed gasket with its beads in contiguous relationship, and FIG. 6 is an enlarged, exploded, perspective view of the clamping and sealing elements and the coacting portions of the fitting.

In the drawings, the numeral 10 designates the tubular body or housing or a fitting for coupling the adjacent ends of pipes 11 and 12. Since the invention resides in the connection of the fitting to the pipe, said fitting is subject to variation and may be of any suitable type, such as an adapter, coupling, elbow, or T. The body 10 has an axial bore 13 which may be reduced in diameter adjacent each end as shown by the numeral 14 in FIGS. 2 and 3 so as to be of slightly greater diameter than the pipe. An annular recess or counterbore 15 is provided at each end of the bore 13 outwardly of each reduced portion 14 and has its inner end surface or bottom wall tapered inwardly to provide a bevelled shoulder 16.

An annular packing element or gasket 17, of rubber or other suitable elastic material and substantially complementary to the counterbore 15, is disposed therein for sealing off around the pipe. The gasket 17 is oblong in cross-section and has an inner end surface or portion 18 which is complementary to the shoulder 16 for engagement therewith. In order to prevent extrusion of the inner extremity of the gasket between the pipe and reduced bore portion 14, a plurality of balls or beads 19 are embedded or molded in the inner extremity of said gasket. Preferably, the beads 19 form a part of a continuous chain, being connected by links 20 and constructed of metal or other suitable material. The beads are of a diameter greater than the width of the space between the pipe and bore portion 14 (FIGS. 2 and 3) and are spaced from one another when undeformed (FIG. 4). Upon deformation of the gasket, the chain is contracted so as to dispose the beads 19 in contiguous relationship (FIG. 5) and coact to prevent extrusion of the inner extremity of said gasket (FIG. 3).

A collar or nut 21 is screwthreaded on each end of the body 10 and has an internal, radial flange 22 for closely surrounding the pipe and forming an annular recess or socket 23. The latter is of greater diameter than the counterbore 15 and has its inner end surface or bottom wall tapered to provide a bevelled shoulder 24 which is inclined inwardly toward the pipe. Preferably, the shoulder 24 has an inclination of approximately 45 degrees.

An annular, split clamp element or ring 25 is disposed within the socket 23 for coacting with its shoulder and an annular thrust member or ring 26. The clamp ring 25 is substantially angular or arcuate in cross-section to provide inwardly-diverging exterior surfaces or portions 27 which are substantially complementary to the bevelled shoulder 24. As shown by the numeral 28, the clamp ring has a pair of inwardly-directed edge portions which are relatively sharp and which function as teeth for biting engagement with the pipe when said ring is compressed as shown in FIG. 3. In order to provide the relatively sharp, internal edge portions 28, the clamp ring is cut from a steel tube and formed into arcuate shape. After case hardening, the ring is notched to permit contraction thereof into engagement with the pipe which has an external diameter substantially equal to the internal diameter of said ring before notching thereof. The notch is of sufficient width to insure a clamping engagement with pipe having an external diameter as much as $\frac{1}{16}''$ undersize.

As shown most clearly in FIG. 6, the thrust member 26 includes a ring 29 which is substantially right angular in cross-section and which includes an external, radial flange 30 and an internal, axial flange 31. Preferably, the ring 29 is formed of the same material as the clamp ring 25 but need not be case hardened. As shown by the numeral 32, the thrust ring has an arcuate portion or convex surface between its flanges for engagement with one of the exterior surfaces 27 of the clamp ring in coaction with the shoulder 24 of the nut 21 which engages the other surface 27. The axial flange 31 is of greater width than the radial flange 30 and has a follower ring 33, which is channel or U-shaped in cross-section, press-fitted thereon for engagement with the outer end of the gasket 17. As shown most clearly in FIG. 3, the follower ring 33 has internal and external diameters which permit its engagement within the counterbore 15 for guiding the thrust ring thereinto as well as preventing extrusion of the outer end of the gasket.

For loosely confining the thrust ring 29 within the socket 23, a lock ring 34 encircles the radial flange 30 of said thrust ring and has a press fit in said socket. The lock ring 34 is angular in cross-section, having an external, axial flange 35 and an internal, radial flange 36 (FIG. 6). Since the internal diameter of the axial flange 35 is greater than the external diameter of the radial flange 30, the ring 29 may undergo movement relative to the ring 34 (FIGS. 2 and 3). Thus, the lock ring serves to retain the clamp, follower and thrust rings in the socket and prevent accidental displacement or loss thereof when the nut 21 is detached from the body 10 of the fitting.

The fitting is assembled as shown in FIG. 2 with the follower ring 33 of the thrust member 26 loosely engaging the outer end of the gasket 17. Upon tightening of the nut 21, the clamp ring 25 and the thrust and follower rings move inwardly toward the body 10 and its counterbore 15. When the gasket is completely or fully deformed as shown in FIG. 3, inward movement of the thrust and follower rings 29 and 33 as well as the clamp ring ceases. The bevelled shoulder 24 of the nut and the convex surface 32 of the thrust ring coact with the exterior surfaces 27 of the clamp ring so as to contract the same and force its edge portions 28 into biting engagement with the pipe. Due to the coaction of the surfaces 24, 27 and 32, the edge portions of the clamp ring positively engage the pipe and hold the fitting against displacement and its gasket in sealing position whereby said fitting is capable of confining fluids under relatively high pressures, of the order of 3500 p.s.i.g. The efficiency of the fitting and its gasket is enhanced by the provision of the balls or beads 19 which prevent extrusion of the inner extremity of the gasket between the pipe and the bore portion 14.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A high pressure fitting for coupling plain end pipe including a body having a bore for receiving the pipe and a counterbore at one end of the bore, a nut screwthreaded on the end of the body and having a recess communicating with the counterbore, the recess of the nut having a substantially axial surface and a transverse inner end surface, annular packing means in said counterbore for sealing off around the pipe, substantially annular split clamp means in said nut recess for engagement with the pipe, peripherally continuous thrust means in said nut recess between the packing and clamp means for deforming said packing means into sealing engagement with the pipe upon tightening of said nut, the thrust means and the transverse end surface of said recess each having a bevelled surface each of which surfaces overlies and engages a separate portion of the clamp means to force said clamp means into clamping position after deformation of said packing means, and means substantially immovably mounted in said nut recess and adapted to engage a portion of said thrust means to loosely confine said thrust means in said recess for retaining said clamp means therein, said thrust means being at least axially movable inwardly of the body with said nut and clamp means until said packing means is deformed and then remaining stationary to prevent damaging of said packing means and to permit coaction of its bevelled surface and the bevelled surface of said transverse end surface of said recess with said clamp means.

2. A high pressure fitting as set forth in claim 1 wherein the means for loosely confining the thrust means in the recess of the nut has an outer portion substantially complementary to and frictionally engaging the substantially axial surface of said recess so as to be rotatable with said nut relative to said thrust means.

3. A high pressure fitting as set forth in claim 1 wherein the thrust means includes a peripherally continuous ring angular in cross-section and having a portion of greater diameter than a portion of the annular clamp means, the thrust ring having an outer radial flange and an inner axial flange directed toward the packing means with the bevelled surface of said thrust means joining the flanges, and follower means on the inner flange complementary to the counterbore of the body for engagement with said packing means, the confining means coacting with the outer flange to loosely confine the thrust ring in recess of the nut.

4. A fitting as set forth in claim 3 wherein the confining means includes a lock ring angular in cross-section and having an outer axial flange and an inner radial flange, the outer axial flange of the lock ring having an external diameter substantially equal to the diameter of the recess of the nut for binding engagement with the substantially axial surface thereof, the inner radial flange of said lock ring overlying the outer radial flange of the thrust ring so as to retain said thrust ring in said recess.

References Cited in the file of this patent
UNITED STATES PATENTS

| | | |
|---|---|---|
| 2,221,064 | Tobler | Nov. 12, 1940 |
| 2,288,506 | White | June 30, 1942 |
| 2,326,939 | Cowels | Aug. 17, 1943 |
| 2,394,351 | Wurzburger | Feb. 5, 1946 |
| 2,452,277 | Woodling | Oct. 26, 1948 |
| 2,463,235 | Andrews | Mar. 1, 1949 |
| 2,469,851 | Stecher et al. | May 10, 1949 |
| 2,478,149 | Wolfram et al. | Aug. 2, 1949 |
| 2,779,610 | Risley | Jan. 29, 1957 |